Nov. 14, 1961 L. M. ADAMS 3,008,325
MELTING POINT APPARATUS
Filed Dec. 15, 1958 2 Sheets-Sheet 1
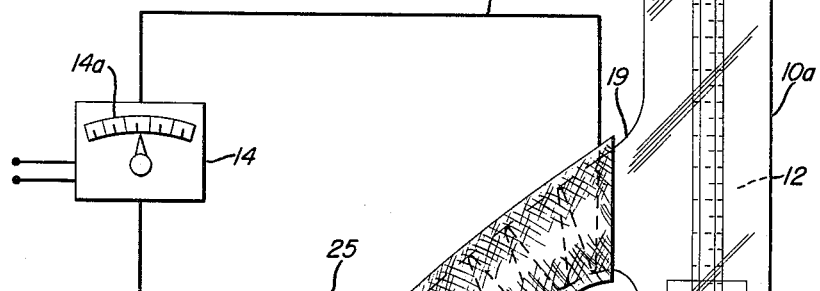
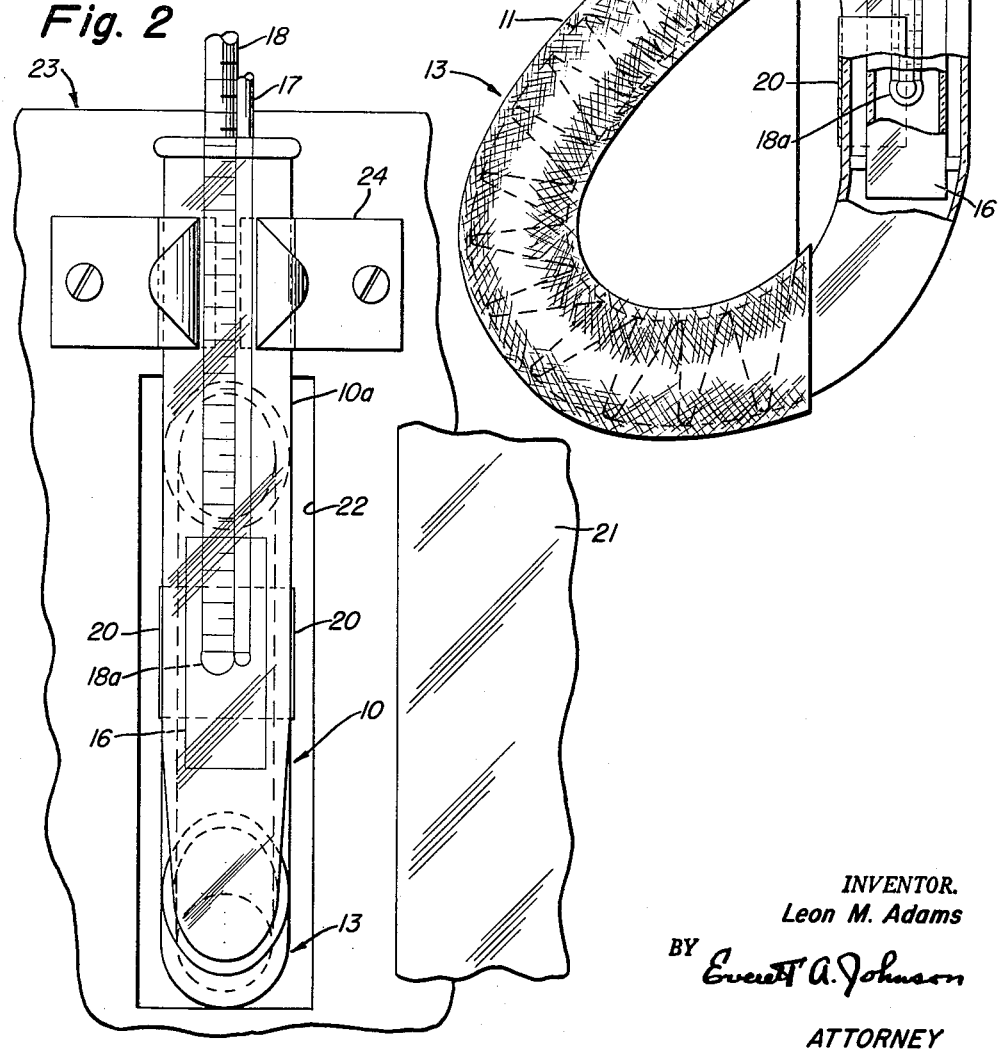
INVENTOR.
Leon M. Adams
BY Everett A. Johnson
ATTORNEY Nov. 14, 1961 L. M. ADAMS 3,008,325
MELTING POINT APPARATUS
Filed Dec. 15, 1958 2 Sheets-Sheet 2
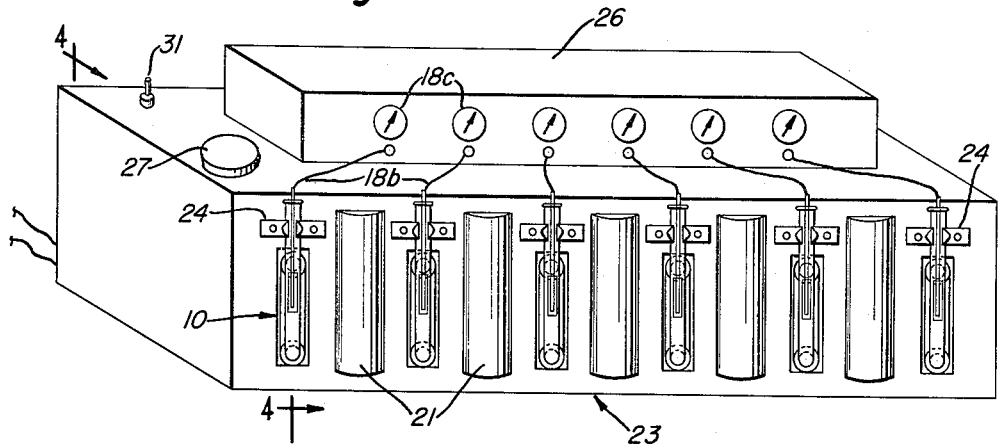
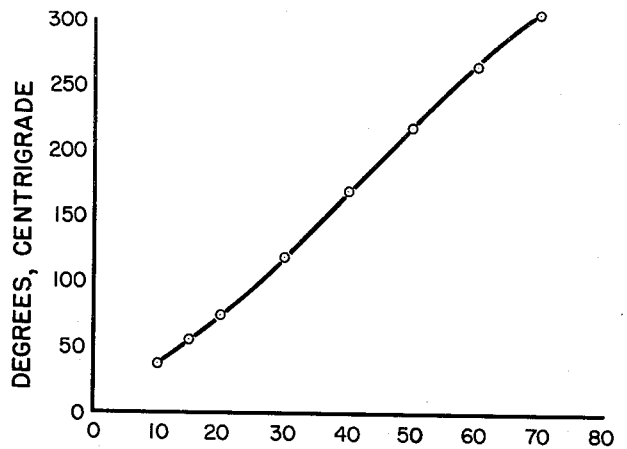
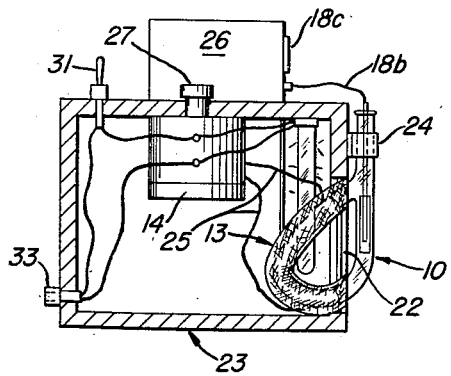
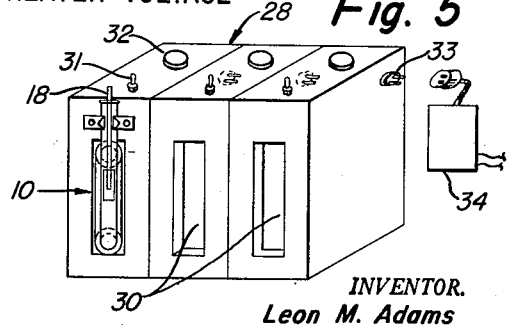
INVENTOR.
Leon M. Adams
BY Everett A. Johnson
ATTORNEY

United States Patent Office 3,008,325
Patented Nov. 14, 1961

3,008,325
MELTING POINT APPARATUS
Leon M. Adams, La Marque, Tex., assignor, by mesne assignments, to Standard Oil Company, Chicago, Ill., a corporation of Indiana
Filed Dec. 15, 1958, Ser. No. 780,463
5 Claims. (Cl. 73—17)

This invention relates to an improved apparatus for determining the melting point of a substance such as finely divided powdered material. More particularly, the invention relates to an improved apparatus and technique for rapidly and conveniently determining and recording the melting point of micro samples in routine laboratory analyses.

Melting point is one of the most commonly determined physical properties of substances and many systems have been proposed. Heretofore, however, there has been no relatively simple system for making such tests.

One method for the determination of melting points of organic compounds which melt above room temperature is the capillary tube method. In such method the capillary tube, containing the small sample, is immersed within a heated liquid bath. Conventionally a Bunsen burner is used for heating which requires constant watching and manipulation, and it is rather tedious and difficult to set and maintain a desired rate of temperature rise in the melting point tube while observing changes produced by heating the small sample of the substance under test.

It is therefore a primary object of my invention to provide an improved apparatus for determining melting points in which the rate of temperature rise is easily controlled over a wide range. It is a further object of the invention to provide a melting point determining system which is capable of giving visual melting point information rapidly on very small samples. A further object of the invention is to provide a melting point apparatus which is adapted for use in routine analyses of a large number of samples. It is also an object of the invention to provide an apparatus which is of such simple construction and operation as to be adapted for use by other than highly trained technical personnel. An additional object of the invention is to provide a controlled bath structure by means of which melting point determinations may be conveniently and readily made. These and other objects of my invention will become apparent and be understood as the description thereof proceeds.

Briefly, according to my invention I provide a system wherein a liquid bath is maintained within a looped tube having a side arm which is electrically heated. This may be done by providing a heater about the side arm, the heater being controlled by a variable voltage supply which may be a variable transformer or resistance. The apparatus is calibrated so that a proper voltage setting can be made to obtain the desired heating rate within the temperature range of the melting point to be determined.

Within the tube I provide a flow directing chimney which receives the flow of liquid from the heated side arm and the sample to be analyzed is supported within a capillary tube mounted in the chimney adjacent a thermometer or thermocouple therein. To facilitate observation of the melting point, the portion of the tube adjacent the transparent chimney may be provided with a light diffusing coating and back-lighted.

The apparatus, according to the above, requires a minimum of watching and permits the operator to obtain accurate melting points. A battery of individual baths may be supported within a single unit having separately controlled heated compartments and thermocouples may be mounted within each bath for recording of the temperature.

A desired rate of temperature increase is 1 to 2 degrees per minute and a calibration curve of applied voltage versus temperature is provided. The voltage is then set for the desired melting point. The temperature of the bath rises rapidly at first and then slows down due to heat loss and other mechanical losses as the melting point is approached. When the melting point is reached, the rate of rise will be 1 to 2 degrees per minute as desired.

Further details and advantages of my system will be described by reference to embodiments of the invention illustrated in the accompanying drawings wherein:

FIGURE 1 is a side elevation, partly in section, schematically showing the general assembly of an apparatus according to the invention;

FIGURE 2 is a front view of the tube apparatus in FIGURE 1 mounted on a panel;

FIGURE 3 is a perspective of an assembly including several test units;

FIGURE 4 is a section taken along the line 4—4 in FIGURE 3;

FIGURE 5 illustrates another embodiment of the invention; and

FIGURE 6 is a calibration curve employed with my apparatus.

Referring to the drawings, the apparatus comprises a melting point tube assembly 10 including the vertical tube 10a and the arm 11 forming a clock-wise circulation loop for the liquid bath 12. This loop acts as a thermal pump; as liquid in the arm 11 becomes heated its density is reduced and it is forced upward and into tube 10a by the weight of cooler and hence heavier liquid in the tube 10a. An electrical heating mantle 13 is disposed about the side arm 11. Power is supplied to the heating mantle 13 by means of a variable power supply 14 which may comprise a potentiometer or variable transformer having a scale 14a on which the power being supplied may be indicated in terms of the temperature of the bath 12.

The melting point tube 10a, comprising a portion of the assembly 10, is transparent and contains the flow directing cylinder or chimney 16 which is axially arranged within the tube 10a below the upper end of the side arm 11.

A capillary melting tube 17, suitably 1–2 mm. diameter thin wall glass, is closed at one end and contains the material on which the melting point determination is to be made. The tube 17 may be supported by the thermometer 18a, although a separate clamping means (not shown) may be provided. In any event, the end of the capillary tube 17, containing the sample, is disposed near the bulb 18a or couple 18b of the temperature measuring means 18, shown schematically in the drawings. Smoother control of the temperature rise experienced by the sample is afforded by surrounding the capillary tube 17 and the temperature measuring means 18 with a flow directing chimney 3.

The temperature measuring means 18 is placed in the melting point tube 10a, which contains a clear high-boiling liquid bath 12, so that the measuring means 18 is at a selected point below the junction 19 of the side arm 11 with the straight portion of the melting point tube 10a. The side arm 11 is then heated by means of the mantle 13 to obtain a rise in temperature of 1°–2° per minute. The melting point of the sample is the temperature indicated by means 18 at which the solid sample in tube 17 becomes liquid. Since the change in the substance is visually determined, the liquid bath 12 should be heat stable and provide rapid heat transfer.

To facilitate observing the occurrence of the melting point, the tube 10a may be provided with a light diffusing coating 20 in the region of the lower end of the capillary tube 17. Such coating 20 comprises a non-reflecting surface which may comprise a frosting produced, for example, by sand-blasting or acid treating of the glass wall. Such coating may also be applied to the remote wall of the chimney 16. A plurality of diffused light sources 21 are provided intermediate the melting point assemblies 10 to back-light the coating 20.

The mantle 13 may be removable or may comprise a wound wire heater coil. In FIGURES 2, 3 and 4 the heater units 13 are supported within the recesses 22 in housing 23 and the side arm 11 of the assembly 10 projects within the recess 22. The upper end of the melting point tube 10a is secured by the clamp 24 to the housing 23 with the side arm 11 and heater unit 13 within a recess 22.

It will be understood that the heater units 13 may be fixed within recesses 22 and are connected to a variable power source 14 by leads 25, and controlled as described with respect to the embodiment in FIGURE 1.

The plurality of assemblies 10 may be monitored continuously or selectively by the array of thermocouples 18b which feed signals to the selector-recorder 26. Individual heater controls 27 may be provided, but where routine melting point determinations are being made on a number of samples of the same melting point a single control may be used. If desired, means such as an air jet (not shown) may be included to cool the melting point assembly 10 following a determination.

In FIGURE 5, I have shown a modular assembly including the individual casings 28 provided with heated compartments 30. On-off switches 31 control the power to individual variable power supplies 14 within the casings 28, each separately controlled by knobs 32. Plugs 33 connect with mating plugs in the side wall of the adjacent casing 28 and with the primary power supply 34. When connected together as shown in FIGURE 5, the individual tests can be made as described and the melting point read from thermometer 18a.

The procedure used in making melting point determinations, in accordance with my apparatus, involves selecting the voltage from a calibration curve such as shown in FIGURE 6, which is typical, and setting the power supply 14 to the desired temperature (voltage) corresponding to the anticipated melting point. The temperature of the bath 12 rises rapidly at first and then less rapidly due to heat loss from the assembly 10 as the melting point of the sample in the capillary tube 17 is approached. When the melting point, as indicated by the thermometer 18a, has been reached, the rate of temperature rise in the device will be 1°–2° C. per minute as is desired in making the melting point measurement.

Many melting points have been made in accordance with my apparatus and a high degree of accuracy has been observed with excellent reproducibility and repeatability.

The invention has been described with reference to several embodiments thereof, and it should be understood that these are by way of illustration only. The invention is not necessarily limited to the illustrated embodiments and alternative operating techniques may be employed with the apparatus in view of the foregoing disclosure. Accordingly, modification in the construction of my apparatus and in the operation thereof are contemplated without departing from the spirit of the invention.

What I claim is:

1. An apparatus for determining melting points, said apparatus being characterized by ease of controlling temperature rise over a wide range, comprising a looped glass tube defining a vertical chamber open at its top and a side arm, said side arm being connected at its lower end to the bottom of said chamber and providing a thermal circulation loop discharging at the upper end of the side arm into said chamber below the top thereof, an electrical heater positioned and arranged to enclose substantially all of said side arm, variable means controlling the power supply to said heater, a small quantity of clear inert heat exchange fluid of low specific heat in said tube, a flow-directing chimney open at both ends and supported within and aligned with said chamber, the upper end of said chimney terminating below the upper end of said side arm, and means for measuring the temperature of said fluid within said chimney.

2. The apparatus of claim 1 which includes a sample capillary supported adjacent the said temperature measuring means.

3. The apparatus of claim 2 wherein said temperature measuring means is a thermometer which is removably supported in said tube.

4. The apparatus of claim 1 wherein the said tube is provided with a light-diffusing coating on a wall portion facing the side arm.

5. The apparatus of claim 1 which includes a casing, said casing having a port adapted to receive the said side arm of said tube, means for mounting said power supply controller within said casing, and clamping means on said casing for supporting said tube on and within said casing.

References Cited in the file of this patent

UNITED STATES PATENTS

| | | |
|---|---|---|
| 2,079,344 | Geyer | May 4, 1937 |
| 2,699,670 | Becton | Jan. 18, 1955 |
| 2,716,371 | Still | Aug. 30, 1955 |